United States Patent [19]

Mead et al.

[11] Patent Number: 5,292,475
[45] Date of Patent: Mar. 8, 1994

[54] TOOLING AND PROCESS FOR VARIABILITY REDUCTION OF COMPOSITE STRUCTURES

[75] Inventors: William T. Mead, Cypress; Colin G. Clayton, Torrance, both of Calif.

[73] Assignee: Northrop Corporation, Los Angeles

[21] Appl. No.: 847,519

[22] Filed: Mar. 6, 1992

[51] Int. Cl.⁵ .................. B32B 31/04; B29C 33/42
[52] U.S. Cl. .................. 264/257; 264/258; 264/313; 264/316
[58] Field of Search .......... 264/257, 258, 313, 314, 264/510, 511, 512, 546, 316

[56] References Cited

U.S. PATENT DOCUMENTS

| | | | |
|---|---|---|---|
| 2,981,976 | 5/1961 | Maier | 264/313 |
| 4,024,623 | 5/1977 | Kun | 264/313 |
| 4,327,052 | 4/1982 | Sauer | 264/512 |
| 4,657,717 | 4/1987 | Cattanach et al. | 264/257 |
| 4,773,952 | 9/1988 | Wesley, Jr. | 156/191 |
| 4,789,416 | 12/1988 | Ford | 156/222 |
| 4,873,044 | 10/1989 | Epel | 264/257 |
| 4,882,118 | 11/1989 | Megarry | 264/258 |
| 4,933,040 | 6/1990 | Wesley, Jr. | 156/191 |
| 5,000,990 | 3/1991 | Freeman | 264/258 |
| 5,087,193 | 2/1992 | Herbert, Jr. | 264/314 |

*Primary Examiner*—Jay H. Woo
*Assistant Examiner*—Duane S. Smith

*Attorney, Agent, or Firm*—Terry J. Anderson; Robert B. Block; Karl J. Hoch, Jr.

[57] ABSTRACT

Variability between composite structures can be reduced by utilizing forming and curing tooling that includes a cure tool and a preform tool. The cure tool has a curing surface. The curing surface defines the shape of a cured composite structure. The preform tool has a preform surface that is divided into at least first and second surface area portions. The first surface area portion is of the same surface shape to the corresponding surface area of the curing surface on the cure tool. The second surface portion is of a surface shape that is different from the surface shape of the corresponding surface area of the curing surface on the cure tool. The differences between the second surface area portion of the preform surface and its complementary surface on the curing surface is such that there is an increase in the surface area of the second surface area portion of the preform surface compared to a corresponding area on the curing surface of the cure tool. Because of these differences, when a preform structure is formed on the preform tool, additional uncured preform material is located at the area defined by the second surface area of the preform tool. Upon curing of the preform structure in the cure tool, this additional material is transferred to adjacent radii resulting in reduction of porosity, bridging, excess resin richness and delamination at the radii.

1 Claim, 6 Drawing Sheets

TOOLING AND PROCESS FOR VARIABILITY REDUCTION OF COMPOSITE STRUCTURES

FIELD OF INVENTION

This invention is directed to tooling for forming composite structures and processes that utilized such tooling. More particularly this invention is directed to forming a preform structure on a tool and then curing that preform structure either on the same tool or in an additional tool and wherein the preform structure is formed to include additional material located adjacent to radii in the cure tool.

BACKGROUND OF INVENTION

Because of their high strength coupled with light weight, composite parts are being increasingly used as structural components in a variety of articles including aircraft structure. Typical composite part materials include glass or graphite fibers that are embedded in resins such as epoxy, phenolic or bismaleimide resins. The fiber and resin are formed into a structure that is then cured under elevated temperature and pressure in a mold or curing tool.

Composite parts destined to be used in the aircraft industry must meet exacting requirements as to their structural integrity. To meet these exacting requirements precise control of lay up, debulking and curing including precise control of temperature and pressure during curing is required.

One widely utilized system for forming structural composite parts utilizes what are termed "prepregs." These are sheets of fiber that have uncured or partially cured resin embedded therein. The individual plies of prepreg, laid one on top of the other, are positioned inside of a cure tool and subjected to heat and pressure to cure the prepreg into a composite material. Various apparatus has been utilized or proposed for initially positioning and then maintaining the prepreg in contact with the tool or mold during the curing cycle. Such apparatus have included press platens, rubber bladders, vacuum bags and trapped rubber molding systems. Each of these has inherent limitations.

Utilizing press platens to pressurize the prepregs during cure is limited to essentially planar parts because of restrictions imposed by geometry. Rubber bladders also are limited by geometrical considerations. U.S. Pat. Nos. 4,773,952 and 4,933,040 both describe composite vacuum bottles that are both laid up and directly cured on a male mandrel utilizing a rubber bladder that fits over the male mandrel to consolidate the structure.

Vacuum bagging is much more versatile and can be utilized for complex parts. In a like manner trapped rubber moldings can also be utilized for some complex parts. In vacuum bagging, plies of prepreg inside a tool are covered with appropriate bleed or barrier cloths. A final vacuum bag is placed over the assembly. Vacuum is applied to the inside of the vacuum bag to evacuate the inside of the bag. The assembly is then loaded into an oven or autoclave and curing is accomplished by simultaneous heating and pressurizing the part in the oven or autoclave.

In trapped rubber molding a closed container is utilized. A portion of the interior of the container includes a mold or die surface that defines the part surface. The plies of prepreg are located on the mold or die surfaces following by appropriate bleed cloths and/or barrier cloths and the like. The remainder of the interior of the container is then filled with a pre-shaped solid silicon rubber member. When subjected to heating the silicon rubber member expands and in doing so it forces the prepreg against the die or mold surface.

Aside from any other consideration, trapped rubber moldings are difficult to control because of excess pressures that may be generated inside of the curing tool. These pressures can exceed desired and safe limits and trapped rubber molding cure tools have been known to catastrophically fail due to excess pressure build up. A variety of expedients have been tried in order to eliminate this type of problem. These include down sizing the silicon rubber expansion member or utilizing powdered or gelled silicon members.

In addition to mechanical problems, both trapped rubber molding and vacuum bagging consistently yield parts which have defects at those areas defined by inside radii on the mold or cure tool. These defects include porosity, bridging, resin richness and delamination. Porosity occurs when gasses or other voids are incorporated into the cured structure. Bridging results when the plies span across inside radius contours of cure tool instead of fitting flush against these contour area of the tool. Delamination results from separation of the plies from one another within the composite structure. Resin richness results from excess resin migration to the outsides of bends, curves and radius areas of the composite structure. Depending upon the extent and severity of the defect, the part may have to be reworked or in a worse case scenario, scrapped. Most delamination defects and a certain percentage of the porosity defects require scrapping of the part. Other porosity defects, resin richness defects and bridging defects have to be reworked. Irrespective of whether or not the part has to be reworked or scrapped, time, materials and processing steps have been wasted. This results in increased part cost.

While we do not wish to be bound by theory, it is presently believed that most porosity, bridging, resin richness and delamination defects located at corner radii of composite structures result from one key cause —this cause is lack of fiber slippage. During curing in female tools, the ends of the fibers within the prepreg plies become trapped and can not slip. Both vacuum bags and trapped rubber moldings tend to trap the fibers at flat areas on either side of corner radii. Since the fibers become trapped and can not slip, during consolidation and compaction they can not move to completely fill the radius areas.

Lack of consolidation leads to porosity. Trapping of fibers fixes the fibers but allows the more fluid resin to move under heat and pressure to the outside of the radius area. This leads to resin richness at these outside areas. Bridging results when the totality of the plies are trapped and can not move while delamination results when some of the plies are trapped and others are not such that the fibers (and resin) that move are separated from other fibers that are trapped.

Heretofore various expedients have been attempted in order to eliminate the above delineated defects. To date the method that has yielded the least amount of defective parts requires excessive hand working of the individual plies into each and every corner radius of a female tool. This and other similar expedients that are labor intensive are expensive to implement. Such labor intensive steps while useful for one or two pre-production parts do not lend themselves to large, medium or even small sized production runs. However, even when such labor intensive steps are implemented, defects still are encountered due to differences in operator skill level and operator attentiveness to an individual part.

Heretofore structural defects, especially corner radius defects of composites structures cured in female tools, have been an inherent problem that has not been solved. Accordingly there is a long felt need for tooling and the processes to minimize defects in composite structures, especially those composite structures that are cured in female tools.

BRIEF DESCRIPTION OF THE INVENTION

In view of the above it is a broad object of this invention to provide tooling that leads to the reduction of defect variability in composite structures.

It is a further object of this invention to provide processes for forming composite structures that result in a reduction in the amount of defects, particularly corner radius defects, that occur in the composite structures.

It is a further object to provide a defect reduction process for forming composite structures that is simple to implement.

It is a further object to provide defect reduction tooling that is economical in both construction and use.

In accordance with these and other objects as will become evident from the remainder of this specification and the claims appended hereto, this invention provides forming and curing tooling for composite structures. The forming and curing tooling includes a cure tool and a preform tool. The cure tool has a curing surface that defines the shape of a cured composite structure. The preform tool has a preform surface that has at least first and second surface areas. The first surface area of the preform surface is a surface that has the same surface shape or a complementary surface shape to a corresponding surface area of the curing surface of the cure tool while the second surface area portion of the preform surface is of a surface shape that is different from either the surface shape or a complementary surface shape of the corresponding surface area of the curing surface on the cure tool.

In a preferred embodiment of the invention the surface shape of the second surface area portion of the preform surface is of a shape that has a greater surface area compared to the surface area of a shape that is either the same shape or of a complementary shape to the corresponding surface of the cure tool.

In preferred embodiments of the invention the second portion of the surface area of the preform surface is one of a convex or a concave shaped surface in cross section. Further, this convex or concave surface is located proximal to a radius on the preform tool. Most preferred is a structure wherein the second portion of the surface area of the preform surface is concave in cross section.

In one embodiment of the invention the cure tool comprises a female tool and the preform tool comprises a male tool. The second portion of the surface area of the preform tool in cross section comprises a concave shaped surface that is located on the male tool in a location proximal to a convex cross sectional radius on the male tool. This embodiment of the invention can further include a cap tool that is shaped to be essentially complementary to at least those portions of the male tool that define the second portion of the surface area of the preform surface.

In embodiments of the invention where the female tool includes at least two elongated concave edges, the male tool will include at least two elongated convex edges and one or more concave grooves. In one embodiment of the invention a concave groove is placed intermediate two of the convex edges on the male tool and in a further embodiment of the invention a concave groove is positioned adjacent each of the convex edges on the male tool.

In a further embodiment of the invention the preform tool comprises a combination of the cure tool and at least one independent member that is sized and shaped to fit into and be withdrawn from the cure tool. This member is further sized and shape to fit adjacent to the curing surface on the cure tool at a location proximal to a radius on the cure tool. Preferredly this member is formed as an elongated teflon member having a cross sectional shape that is formed at least in part as a surface of rotation.

Further, in accordance with this invention there are provided processes for forming composite structures from uncured plies of composite material that include selecting a cure tool having at least one edge that has an inside radius. These processes further include forming a preform structure from individual plies of an uncured composite material. The preform structure is formed in a shape that essentially mimics the gross shape of the curing tool and in addition further includes at least one of a convex or a concave area formed in the preform structure immediately adjacent any portion of the preform structure that mimics the edge of the curing tool and where the convex or concave area on the preform structure is formed on the preform structure in an area where there are no corresponding shape on the curing tool. The processes further include curing the preform structure in the cure tool under a pressure sufficient to transfer material from the convex or concave area toward an adjacent edge.

In a preferred embodiment of the invention the preform structure is formed on a further tool different from the curing tool. This further tool includes a surface that defines the convex or concave area. In this embodiment the cure tool includes a female tool having at least one edge that has an inside radius whereas the further tool includes a male tool that is essentially complementary to the gross spatial shape but not the exact size of the female tool. Further the male tool includes at least one convex or concave area formed on the male tool immediately adjacent any portion of the male tool that is complementary to the edge in the female tool and additionally where the convex or concave area formed on the male tool has no corresponding shape on the female tool. The process can further include selecting a cap tool that is shaped to be essentially complementary to the male tool and forming at least a portion of the preform structure on the male tool followed by locating the cap tool over the preform structure on the male tool and applying pressure to the cap tool to consolidate the preform structure on the male tool.

Further in accordance with this invention there are provided processes for forming tooling for making composite structures. These processes include forming a female tool having a cavity that defines the shape and dimensions of a composite structure and where the cavity includes at least one edge. The process further includes forming a male tool that is in part complementary to the female tool and in further part is non-complementary to the female tool with the non-complementary part of the male tool including one of a convex projection or a concave groove that is located on the male tool adjacent to an edge on the male tool and wherein the edge on the male tool is complementary to an edge on the female tool.

BRIEF DESCRIPTION OF THE DRAWINGS

This invention will be better understood when taken in conjunction with the drawings wherein:

FIG. 16 is a representational view of a male tool and composite prepreg plies located on that male tool;

DETAILED DESCRIPTION OF THE INVENTION

U.S. Pat. No. 4,789,416 to Ford outlines certain definitions which are known in the art and are herein incorporated by reference. These definitions includes that of a "preform." As defined in this patent, a preform is understood in the art to be an uncured part, i.e. a part formed from a lay up to a predetermined shape, which is yet to be cured to a final structural part. A "lay up," in turn, is understood in the art to be an aggregate of individual laminates. The terminology "preform" and "preform structure" are used interchangeably in this specification.

Typically used in the art for laminates are structures known as "prepregs". These are composite materials having reinforced fibers in polymer matrices. The polymer matrix is in an uncured or in a partially cured stage. The fibers generally include glass, graphite, kevlor or other type fibers whereas the resin materials are epoxies, phenols, bismaleimides and the like. Typically the prepreg is sticky and tacky such that one ply easily adheres to a further ply.

Individual plies of prepreg are laid up over a surface defining a particular shape. Lay up can be accomplished one ply at a time or several plies can be adhered to each other in what is termed as a "book" and the book then applied to the surface defining the shape of the article being constructed.

Figure 2:
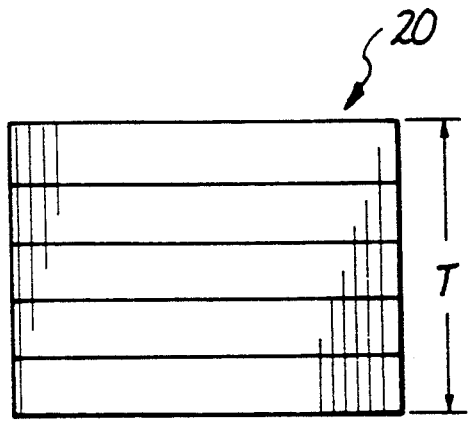
FIG. 2 is a representational view of plies of prepreg utilized to form composite structures prior to consolidation and debulking of these plies.
Figure 3:
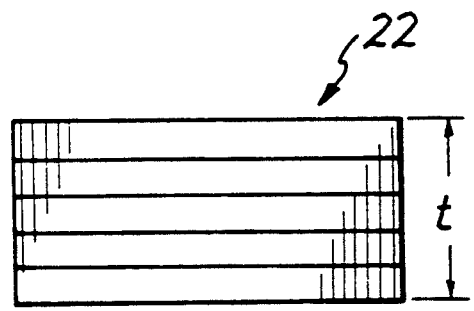
FIG. 3 is a view similar to FIG. 2 showing the plies after consolidation and debulking of the same.

Shown in FIG. 2 is a representational view of a series of plies of prepreg 20. The plies 20 are in a unconsolidated or undebulked state such that they have a thickness "T". In forming an article from the plies, after "lay up," the plies are consolidated or debulked. As is shown in FIG. 3 for debulked plies 22, after debulking the plies have a smaller thickness "t". Debulking removes voids between the individual plies, expels air or other gases and consolidates the plies into a more uniform structure.

The plies of prepreg can be debulked prior to lay up, during lay up of a preform and/or simultaneous with cure utilizing a vacuum bag or the like. Irrespective of the debulking techniques practiced, a construct of prepreg plies must undergo a decrease in its thickness from an initial lay up thickness to the cured thickness. After curing the plies are integrally formed into a composite structure.

Figure 1:
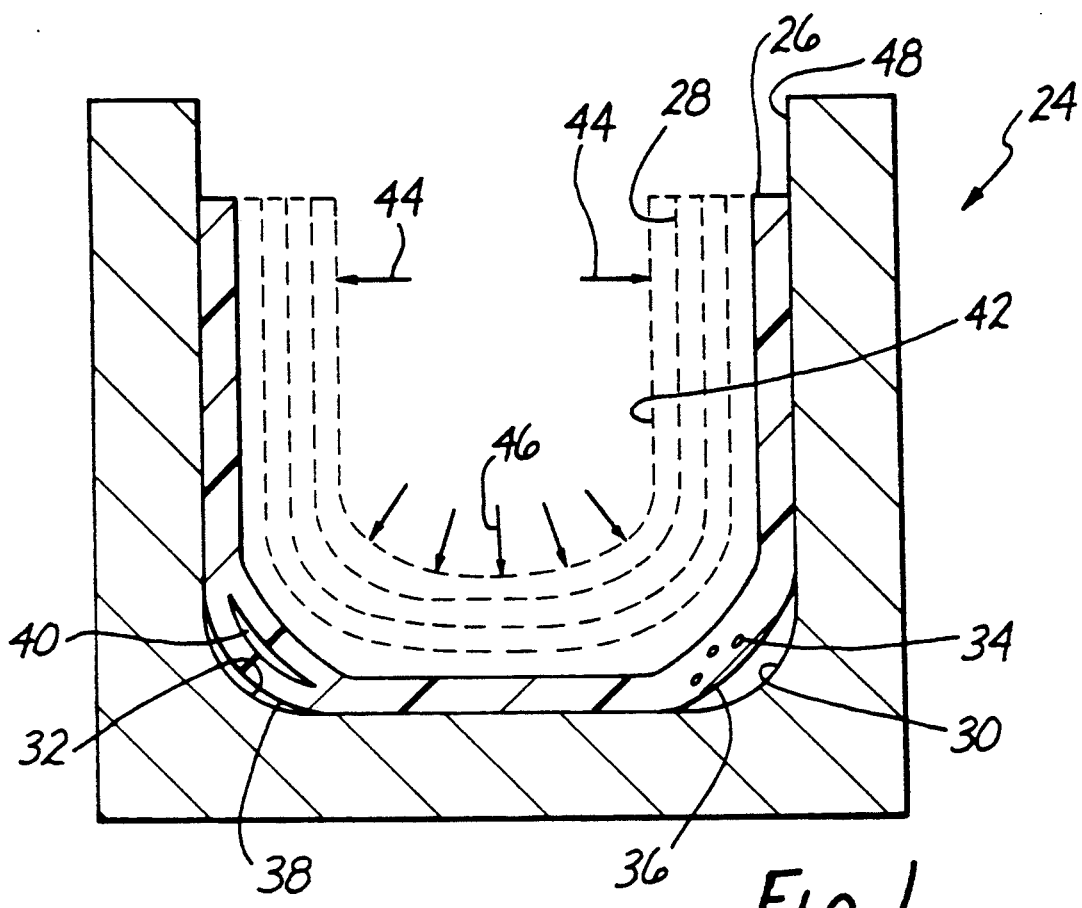
FIG. 1 is a side elevational view in section of a prior art tool and part formed on that tool.

Illustrated in FIG. 1 is a typical prior art tool 24, a composite structure 26 formed on that tool and, shown in phantom lines, a plurality of plies 28 of prepreg. The plies 28 are layered one on the other on the tool 24. After the desired number of plies have been positioned on the tool, the plies are subjected to increases in both temperature and pressure, as for instance utilizing a vacuum bag, rubber expansion mandrel or the like, in an oven or autoclave to cure the plies 28 into the composite structure 26. Tool 24 is a typical female tool having inside radii 30 and 32.

Shown in the composite structure 26 are several common defects that typically occur in forming composites utilizing prior art tooling and processes. These include voids 34 that give porosity to the composite structure 26, bridges 36 and 38 at the radii 30 and 32, respectively, and delamination area 40 adjacent the bridge 38. Not shown would be a resin enriched area that might occur on the outside radius of the bridges 36 and 38. Each of these problems, i.e. voids 34, bridges 36 and 38, delamination area 40 or radius enrichment, form defects in the composite structure 26 that may render the composite structure 26 useless.

While we do not wish to be bound by theory it is presently believed that each of the defects shown in FIG. 1 have a common source. This common source is as follows. During cure or prior to cure during debulking and consolidation, pressure exerted to inside surface 42 of the plies 28 at essentially flat areas depicted by the numerals 44 and 46 respectively, lock the fibers in the plies 28 to the inside surface 48 of the tool 24. Because the plies are essentially locked at the areas 44 and 46, the plies cannot slip one upon the other in the female tool. Since they can not slip, they can not be moved or compacted into the area near the inside radii 30 and 32. The bridging 36 and 38 is a direct result of the plies 28 not moving snugly against the inside radii 30 and 32 of the tool 24. Porosity results from insufficient consolidation of the individual plies also near the inside radii 30 and 32. Delamination results from certain of the plies being moved to greater extent than other plies such that the plies separate forming an interply fracture zone. Resin richness results from locking of fibers but not of the resin such that the resin tends to migrate toward the radii 30 and 32.

Each of the problems associated with the prior art structure of FIG. 1 are eliminated utilizing the tooling and processes of this invention. Briefly, this invention provides extra lengths of prepreg fibers adjacent to radii in a tool such that locking of the plies of prepreg against flat areas of the tool does not inhibit movement of the fibers of the plies directly into the radii of the tool. Because extra lengths of prepreg fibers are provide, proper consolidation and debulking can occur prior to or during curing of the plies at these corner areas. How this is accomplished is shown in FIGS. 4 and 5.

Figure 5:
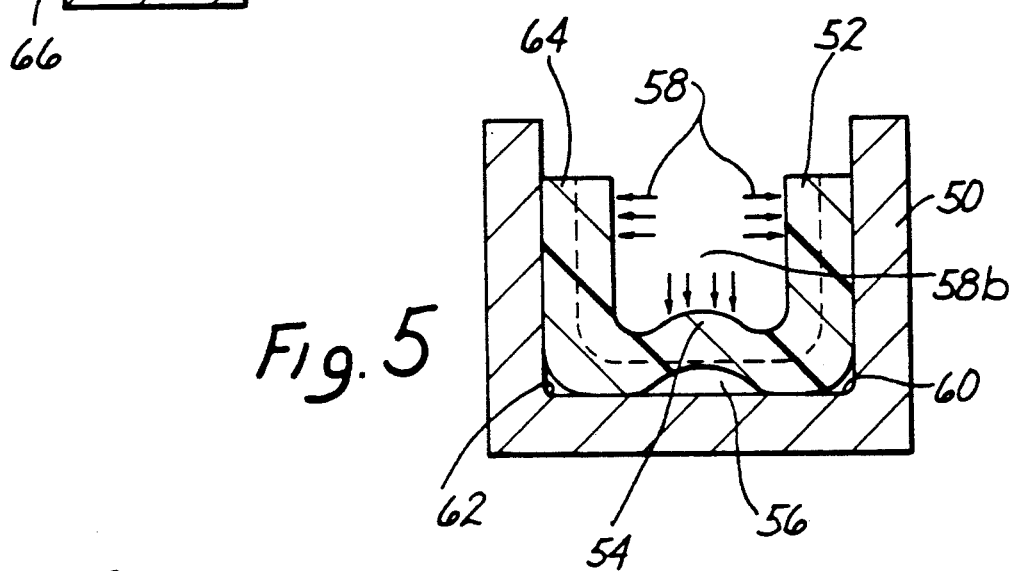
FIG. 5 is a representational side elevational view of a female tool with a preform structure located in that female tool.

In FIG. 5, a female tool 50 having the same shape as the female tool 24 of FIG. 1 is shown. A preform 52 formed from a number of individual plies of prepreg is loaded in the tool 50. Contrary to the shape of the plies 28 as seen in FIG. 1, the preformed structure 52 has a geometry that does not mimic (is not complementary to) the inside geometry of the tool 50. The geometry of the preform 52 is different from that of the tool 50 in that there is an extra area of material located at area 54 of the preform 52. The extra material at area 54 effectively increases the length of the fibers of the preform adjacent the critical corners area of the tool 50.

When the preform 52 is initially loaded in the tool 50 there is a void area 56 located between the bottom surface of the tool 50 and the area 54 of the preform 52. When pressure, as is indicated by pressure lines 58a and 58b, is applied to the preform 52, while the preform 52 may become locked to the sides of the tool 50 near the opening in the tool 50 in line with the pressure lines 58a, over the area 56 the pressure, as indicated the pressure lines 58b, pushes downwardly causing the plies of preform to move downwardly and outwardly. As a result of this movement the preform material is moved into and compacted in the radii 60 and 62 resulting in these radii areas having the same thickness and same amount of prepreg fiber loading as does any other remaining area within the tool 50. After debulking and consolidation the shape of the composite structure as shown by the shape 64 in phantom line completely fills the interior of the tool 50 at the radii 60 and 62 with no bridging, voids, delamination or resin enrichments at these areas.

Figure 4:
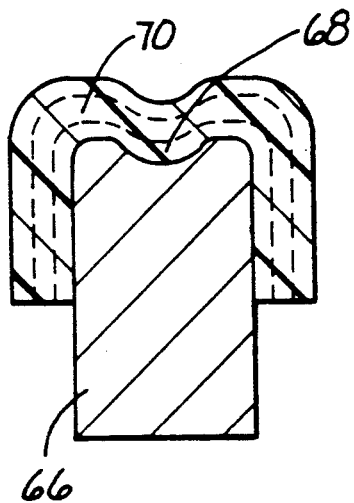
FIG. 4 is a representational side elevational view of a male tool with a preform structure located on that tool.

The preform 52 is formed as is shown in FIG. 4. In FIG. 4 a male tool 66 is shaped to includes a concave area 68 on its surface. Individual plies of prepreg are laid on the tool 66 building up a layer of plies 70 on the tool 66. The layer of plies (either in an un-debulked or in a preferred debulked state) form the preform 52. The preform 52 can now be transferred to the tool 50 for final cure.

Figure 6:
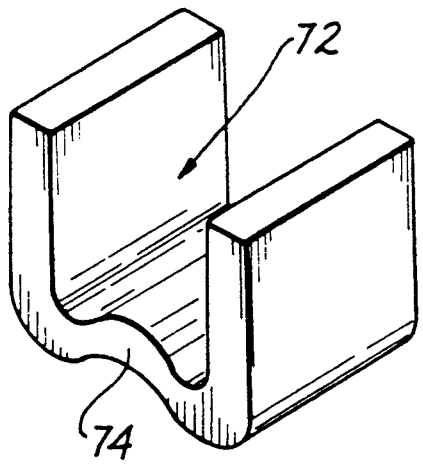
FIG. 6 is an isometric view of a preform structure formed on the tool of FIG. 4.

In FIG. 6 the numeral 72 is utilized to identify a preform structure that has been formed on a male tool, as for instances the male tool 66. At the curved area 74 in the center of the "C" shaped structure 72 there is an extra amount of material compared to the final cured composite structure 76 shown in FIG. 7. Preformed structure 72 is loaded into the tool 50. It is vacuum bagged in a normal manner (including appropriate bleed cloths, barrier cloths and release layers as appropriate). For the final composite structure 76, while the areas 78 and 80 were locked against the inside of the cure tool 50, the area 82 was not and the individual plies were allowed to move into the radius edge areas 84 and 86. As a result, the totality of the structure 76 is uniform throughout all of the areas 78, 80, 82, 84 and 86. There is no porosity, no bridging, no delamination, nor excess resin richness at the radius edges 84 and 86. Fiber slippage was allowed to occur during the debulking and cure cycle such that fibers within the area 74 of the preform structure 72 moved outwardly to fill up the areas near the radius edge areas 84 and 86 of the composite cured structure 76.

Figure 11:
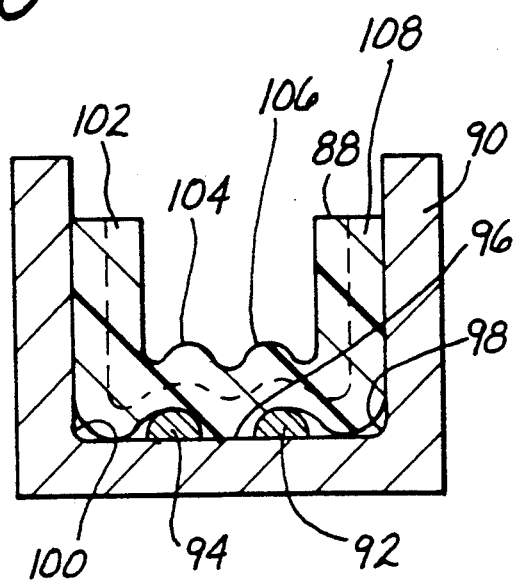
FIG. 11 is a representational side elevational view of a female tool with a preform structure located in that female tool.

Referring now to FIG. 11, a further tool 90 and an associated process is described for forming a preform structure 88. Structure 88, which when debulked and cured in a tool 90, also will form a structure similar to the cured composite structure 76 of FIG. 7. In this instance, however, differing from the process and tools described in FIGS. 4 and 5, for FIG. 11 only a single tool 90 is utilized.

Prior to introduction of the plies of prepreg into the tool 90, hemispherical teflon rods 92 and 94 are laid onto the surface 96 of the tool 90. The rods 92 and 94 are positioned adjacent to or proximal to radii 98 and 100 of the tool 90. Individual plies are positioned in the tool 90 on top of the teflon rods 92 and 94 to form a preform structure 102. The preform structure 102 has two convolutions 104 and 106 in the area adjacent the surface 96. The teflon rods 92 and 94 are now withdrawn from the tool 90 and the tool 90 with the preform structure 102 is then vacuum bagged, debulked and cured in a normal manner. Material from the convoluted areas 104 and 106 can now move toward the radii 98 and 100 such that the composite structure shown in phantom line by the numeral 108 is formed in the tool 90. As in the above described prior embodiments, in the structure 108, at the radii 98 and 100, there is no porosity, bridging, delamination or resin richness.

Figure 8:
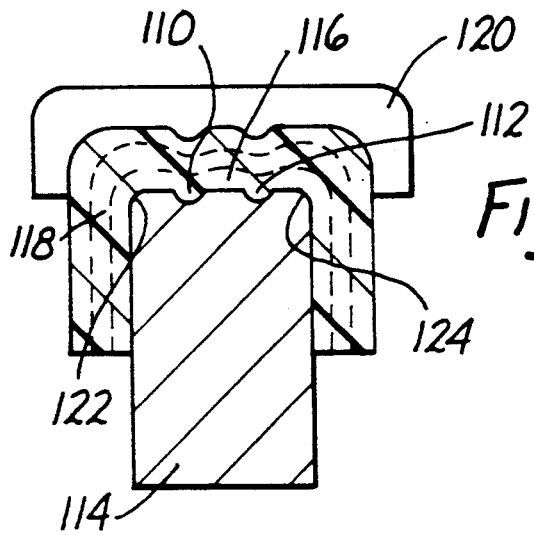
FIG. 8 is a representational view of a further tool similar to the tool of FIG. 4.

In a further embodiment as shown in FIG. 8, for composite structures which are wider than those typically shown in FIGS. 4 and 5, but which are made with tools similar to those of FIG. 4, two grooves 110 and 112 can be formed in male tool 114. These grooves are separated by a land 116. A preform structure 118 can then be laid up on the tool 114 with the preform structure 118 assuming the geometry or shape of the grooves 110 and 112.

The preform structure 118 is debulked on the tool 114 utilizing a cap tool 120 to insure that the preform structure 118 assumes the shape of the tool 114. A similar cap tool could also have been utilized with the tool 66 of FIG. 4 shaping the layers of plies 70 thereon such that they assume the shape of the preform 52 shown in FIG. 5.

The embodiment of FIG. 8 is useful for structures wherein two inside radii (on a female tool) and the corresponding complementary outside radii on a male tool are separated by a sufficient distance such that ply locking might occur in a female tool. Even though the preform structure 80 might lock in a female tool adjacent the areas of the preform 118 that are formed on the land 116, because of the convolutions formed in the preform structure 118 by the grooves 110 and 112, additional preform material is available adjacent to each of the edges 122 and 124 of the preform 118. This additional material can move during debulking and curing to the inside radii of an appropriate female tool, as for instance a female tool similar to that of tool 50 of FIG. 5.

Figure 9:
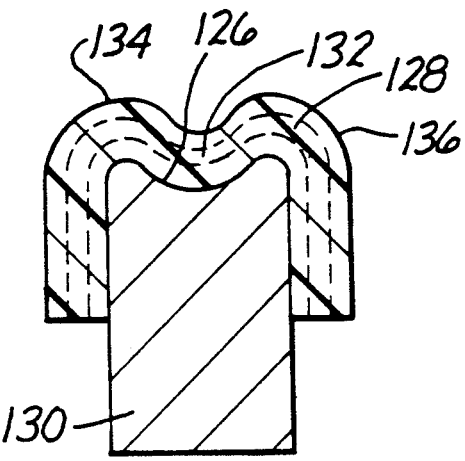
FIG. 9 is a representational view of a further tool similar to the tool of FIG. 4.

In a further embodiment as depicted in FIG. 9, a larger groove 126 is formed in preform 128 being laid up on a male tool 130. The groove 126 is sized such that sufficient material is formed in a convolution 132 in the preform 128 to allow for material movement outwardly in both directions toward radii 134 and 136.

Figure 10:
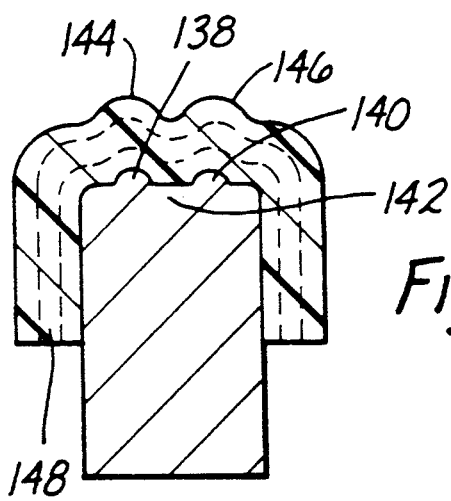
FIG. 10 is a representational view of a further tool similar to the tool of FIG. 4.

An even further embodiment of the invention is shown in FIG. 10. In this embodiment, instead of concave surfaces being formed in the male tool, convex surfaces 138 and 140 are formed in male tool 142. The convex surfaces 138 and 140 serve to form convolutions 144 and 146 in preform 148. During consolidation of the preform 148 in a female tool, the convoluted areas 144 and 146 serve to supply sufficient material to allow for slippage of the fibers of the preform 148 to the inside radii of the female tool in a manner as previously described for the other embodiments, as for instance the embodiment of FIG. 5.

As described above, each of the embodiments include a female or cure tool, i.e. tools 50 and 90, as well as a preform or male tool, i.e. tools 66, 114, 130 and 142, or for the embodiment of FIG. 11, the combination of the tool 90 and the rods 94 and 96. Each of the cured or female tools have a curing surface which defines the shape of a cured composite part. Each of the preform or male tools have a preform surface. That preform surface can essentially be divided into two parts. The first part is a surface which, in the embodiment as depicted by FIGS. 4 and 5, is complementary to corresponding portions of the curing surface in the female tool 50, but further includes other areas, illustrated by the concave area 68 of tool 66, that are not complementary to the corresponding areas in the female tool 50.

In the embodiment of FIG. 11, the shape of the preform tool, i.e. the combination of the female tool 90 and the rods 94 and 96, would not be complementary, but would be the same as the cure tool. In this instance the first surface portions of the preform tool are the same as those of the cure tool whereas the second surface portions, i.e. those defined by the rods 94 and 96, are different from the shape of the female cure tool 90. In each instance the second portions of the surface of the preform tool form a shape that essentially has a greater surface area than a shape that would be formed if the preform tool was exactly the same shape or was a perfectly complementary shape to that of the cure tool.

As is shown in FIGS. 4, 8, and 9, the second portion of the surface area of the preform surface of the preform tool is essentially concave in shape whereas in FIGS. 10 and 11, it is convex.

The above described tooling allows for practice of a process of the invention wherein a cure tool is selected that has at least one edge that has an inside radius. A preform is formed of individual plies of uncured composite material with the preform being formed in a shape that essentially mimics the gross shape of the cure tool (but not necessarily its exact dimensions) and in addition further includes at least one convex or concave area that is formed in the preform with this area being positioned immediately adjacent any portion of the preform that mimics an edge of the cure tool. Further, the convex or concave area formed in the preform has no corresponding shape on the cure tool. Finally the preform is cured in the cure tool under pressure sufficiently to transfer the material from the convex or concave area toward an adjacent edge.

Figure 7:
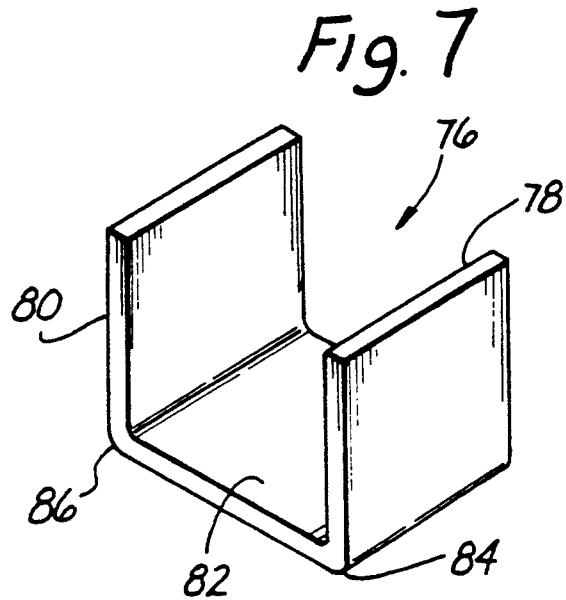
FIG. 7 is an isometric view of a composite structure formed on the tool of FIG. 5.

Utilizing the preform and composite structure of FIGS. 6 and 7, the preform 72 of FIG. 6 has a convex (as viewed from the inside of the preform 72) area formed adjacent the two edge areas of the "C" shaped structure. Upon curing, this convex area is formed into a flat area within the composite structure 76. Thus, the flat area, area 82, of the composite structure 76 has no corresponding shape to the concave area, area 74 in the preform structure 72.

Figure 12:
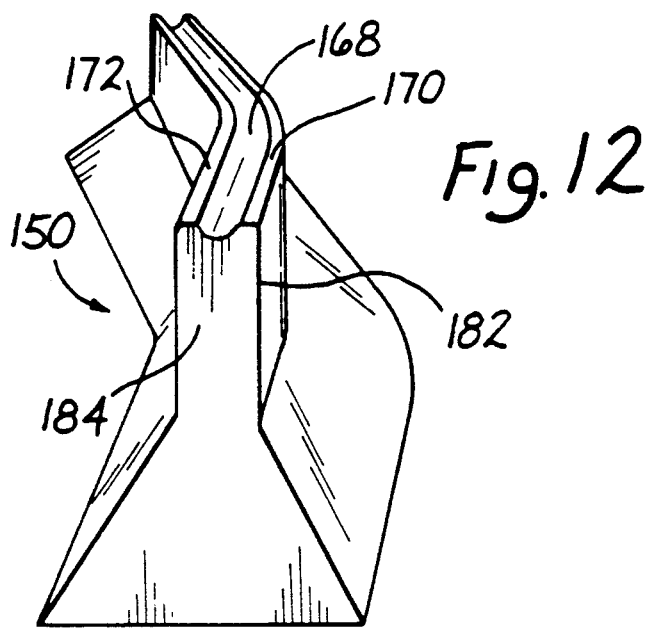
FIG. 12 is an isometric view of a male tool of the invention.
Figure 13:
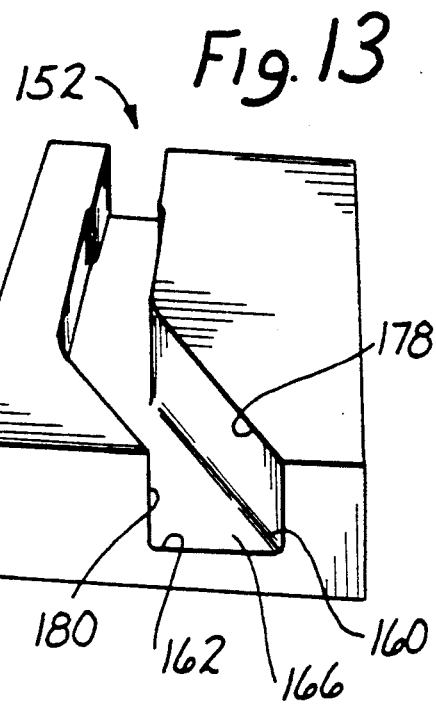
FIG. 13 is an isometric view of a female tool of the invention.
Figure 14:
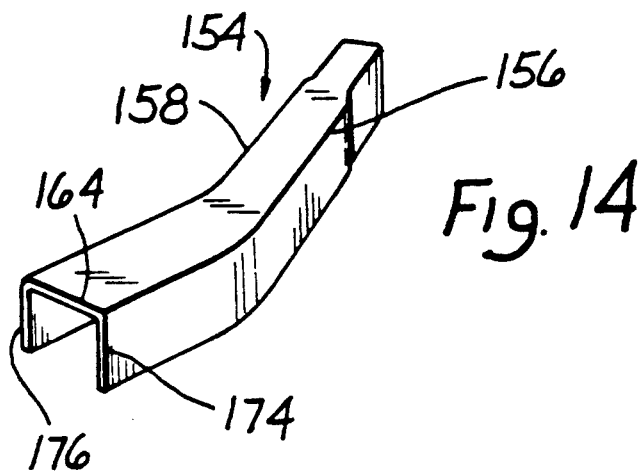
FIG. 14 is an isometric view of a composite structure formed on the tools of FIGS. 12 and 13.

Shown in FIG. 12 is a male tool 150. Shown in FIG. 13 is a female tool 152 and shown in FIG. 14 is a composite part 154 formed utilizing the tools 150 and 152. The composite part 154 is a "C" shaped frame member having edges 156 and 158. These edges in turn are formed from inside radii 160 and 162 in the female tool 152. The composite part includes a flat area 164 that is located between the edges 156 and 158. This flat area 164 is formed by flat area 166 in the female tool 152.

Contrary to the flat area 166 in the female tool 152, the corresponding area in the male tool 150 is formed as an elongated groove 168. The groove 168 is positioned between two outside radii 170 and 172. Flanges 174 and 176 on the part 154 are formed against inside walls 178 and 180 in the female tool 152 whereas in the corresponding male tool 150, a preform formed on the male tool 150 would have the flange areas 174 and 176 formed against outside walls 182 and 184.

In comparing the tool 150 to the tool 152, the shape of the tool 150 is, in fact, complementary to the shape of the tool 152 with respect to those portions of the tool which define the composite part 154 in all areas except with respect to the nonconcurrence of the tools 150 and 152 at the flat area 166 of the female tool 152 and the corresponding groove 168 in the male tool 150. The width between the outside walls 182 and 184 of the male tool 150 is smaller than the width between the inside walls 178 and 180 of the female tool 152 to account for the thickness of the preform to be formed on the tool 150 and transferred to the tool 152 for curing.

In laying up a preform on the tool 150, individual plies or books of plies of prepreg are draped over the tool 150. These can be consolidated and debulked on the tool 150 utilizing a rubber membrane on a vacuum table to reduce the thicknesses of the plies from that essentially seen in FIG. 2 to that essentially seen in FIG. 3. As such the male tool 150 is selected to be of a size such that after consolidation of the preform on the male tool 150, the preform is sized to fit into the female tool 152.

Various prepregs can be utilized to form composite structures using the tools and process of this invention. These included a uni-directional AS4/3501-6 prepreg available from Hercules and a woven AS4/BMI 5250-4 prepreg available from BASF. These can be used to form typically 10 or 20 ply composite structures. For a typical 20 ply composite structure, the prepreg will be laid up in books of 4, 5 or even 10 plies. Typically such books will be pre-consulated prior to lay up and also further consolation on the male tool using a rubber membrane and vacuum source.

Sizing of the male tool 150 with respect to the female tool 152 can be effected utilizing various expedients ranging from simple trial and error to the use of algorithms for predetermining tool size prior to machining of the same.

Figure 15:
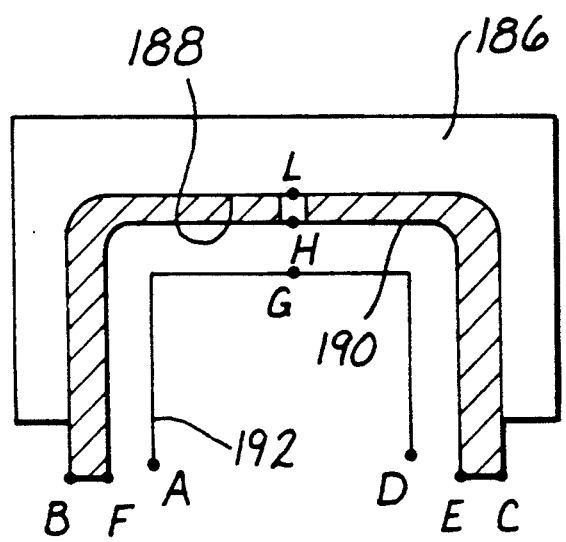
FIG. 15 is a representational view of a female tool, a composite structure and prepreg plies for that composite structure.
Figure 10:
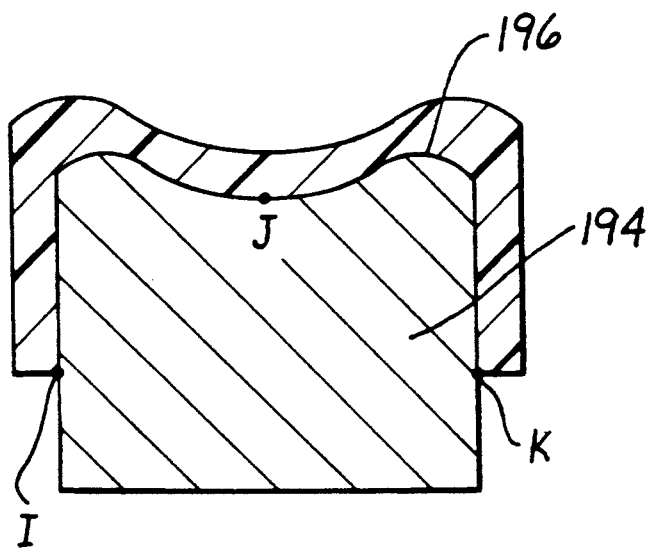

Referring now to FIG. 15 a female tool 186 is shown in cross section. The inside surface of the female tool is defined by line "B-L-C". This will define the outside surface of a composite structure 188 that is formed in the female tool 186. The inside surface 190 of the structure 188 is defined by line "F-H-E". The prepreg plies that are formed into the structure 188, prior to debulking of those plies have an outside surface 192 defined by line "A-G-D". From FIG. 15, the difference between the lines "A-G-D" compared to line "F-H-E" can be calculated. This is calculated as a contour length difference between the uncured plies and the inside surface of the final cured plies, i.e. the final composite structure.

Referring now to FIG. 16, a male tool 194 can be defined to include a groove on its surface as discussed above. The surface 196 of this male tool has a contour length defined by the line "I-J-K". This contour length can be defined to equal the length of the line "A-G-D" plus the difference between the line "F-H-E" and the line "A-G-D" of the tool 186 of FIG. 15. Thus, a contour length of the surface 196 can be calculated that will supply sufficient length to the inside surface of the plies to allow them to be move within the female tool 186 as seen in FIG. 15 such that they assume the final inside surface length shown by line 190, i.e. line "F-H-E.". As so sized the fiber length in the preform is of a sufficient length to allow for movement of the fibers within the preform plies into adjacent radius areas of the cured composite structure formed in the female tool to position sufficient preform material at the inside corners or inside radii within the female tool to insure that there is no porosity, no bridging, no delamination, nor resin richness at radii formed on the composite structure. Referring back to FIGS. 2 and 3 and at the same time to FIGS. 15 and 16, it is evident that the two 90° bends of the tool 186 when considered together essentially add up to a bend of 180°. The thickness between the ply surface 192 and the surface 188 essentially equal the thickness "T" of FIG. 2 whereas the thickness between the surface 190 and the surface 188 of the composite structure formed in the tool of FIG. 15, forms the consolidated ply thickness "t" of FIG. 3.

The length of an arc of a hemisphere is given by $\pi R$. Together the two 90° bends of the structure of FIG. 15 form (to a first approximation) a hemisphere. Thus, to a first approximation, the length of the difference between lines "A-G-D" and "F-H-E" is $\pi R$. The radius, however, of this hemisphere is equal to the difference between the value "T" of the uncured plies and the value "t" of the cured plies. Therefore, the length of the difference between line F-H-E and A-G-D is equal to $\pi(T-t)$ as a first approximation.

The debulking factor equals the difference in thickness, i.e. $T-t$, that the plies undergo. The debulking factor per ply is this number divided by the number of plies, or otherwise stated $DF=(T-t)/N$. Substituting into the above first approximation equation, the difference between the surface of the unconsolidated plies and the consolidated part line therefore equals $\pi NDF$. Knowing the debulking factor for a particular prepreg and the number of plies, this value is easily calculated.

Utilizing these and other known design considerations a male tool lay up design of a proper dimension can be calculated to fit a particular female cavity tool and provide for sufficient material to allow for movement of the prepreg fibers to fill in the corners of the cured composite structure to minimize corner defects.

Figure 19:
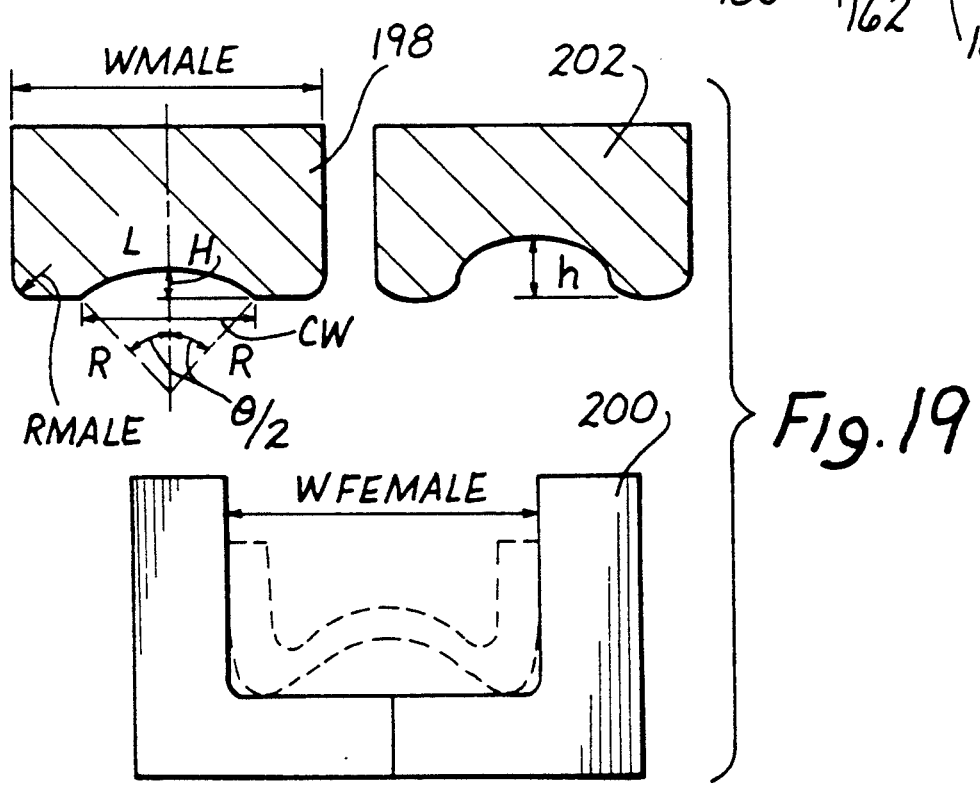
FIG. 19 is a representational view showing both male and female tools and certain geometrical features on these tools.

Such a calculation utilizes the structure shown in FIG. 19.

The tool dimensions of a male lay up mandrel 198 that allows composite material of the male preform to be cured in a female cavity tool 200 with minimal corner defects is calculated utilizing the tools 198 and 200 of FIG. 19 wherein:

R = radius of groove on male tool;
h = cutter height;
CW = cutter width; and
L-CW = Fiber contour length difference.

A desired radius of the male tool groove (i.e. a ball cutter radius) is selected and the desired height and width of the cut for the material to be cured is then calculated. In order to calculate the control length change during the cure the following parameters are used:

N = Number of plies on male;
DF = Debulk factor per ply = $(T-t)/N$;

Values of DF have been experimentally determined for 5250-4 BMI/AS4 celion woven SH satin weave at 120° F. and debulked for 5 minutes and left for two days without vacuum. These values are:

DF = 0.008125 ins./ply after 120° F. for 5 minutes under vacuum; and

DF = 0.0065 ins./ply after 160° F. for 5 minutes under vacuum.

Further taking in to account tool thermal expansion the following are defined:

XLF1 = Thermal Expansion Coefficient of Male Tool; and
XLF2 = Thermal Expansion Coefficient of Female Tool.

The thermal expansion coefficient of aluminum is known:

AL = $13.1 \times 10^{-6}$ in/in ° F.

The part will be cured at a temperature usually 350° F. therefore:

Cure temp = 350 and the preform will be debulked usually at 120° F., DT = 120 and placed in a female cavity where $W_F$ = width of female tool; and
$R_F$ = corner section radius of female tool.

The control length differential, i.e. the difference in fiber length between the preform and the cured spar is determined as:

$$(L - CW) = \text{Debulk Factor during cure} + \quad \text{equation 1.}$$

Thermal Expansion Differential between Female and Male +

Peel Ply if used on OML of preform +

Part clearance in tool,

Substituting values:

$$(L - CW) = N \times DF \times \pi \{\text{or}(T - t), \text{if known}\} - \quad \text{equation 2,}$$

$$XLF \times (W_F - N \times DF - N \times 0.014) \times (DT - 70) -$$

$$0.005 \text{ with peel ply} - 0 \text{ no peel ply} + -0.003 \text{ clearance}$$

where DT-70 is the debulk temperature minus the room temperature temperature.

L-CW is first calculated from the input data or it may be derived from experimental data.

The values of h,c and R and L-CW are then calculated to find those specific values of h, CW, R, L-CW that match the required L-CW value of equation 2 above, i.e. L-CW is calculated by solving the transcendental equations 2 and 3, where:

$$(L-CW) = 2R \tan^{-1}(CW/2(R-H)) - CW$$

where $$h = R - 0.5\sqrt{(4R^2 - CW)}, \quad \text{equation 3.}$$

R = male, for woven plies is calculated as:

$$R \text{ male} = R \text{ female} - \text{thickness of preform}, \quad \text{equation 4,}$$
$$= R \text{ female} - N(0.0135 + DF) - 0.002, \quad \text{equation 5,}$$

assuming A4000 release teflon film is placed on male mandrel. The thickness of the woven cured ply is measured as 0.0135 in. and should be 0.0052in. for cured unidirectional plies.

w male, for woven plies is calculated as:

$$W \text{ male} = W \text{ female} - 2 \times N \times (DF + 0.0135), \quad \text{equation 6.}$$

For calculating the maximum and minimum ball mill cutter width:

$$C \text{ maximum} = w \text{ male} - 2R \text{ male}$$

and minimum value of the cutter width, as a rule of thumb, $$C \text{ minimum} = w \text{ male}/4$$

otherwise severe wrinkling will occur.

A special case of the lay up mandrel design for variability reduction is shown for the tool 202 of FIG. 19 where the male recess cut is made tangential to the male radii, as shown in FIG. 19. The width of the cut CW' is shown as:

$$CW' = W \text{ male} - 2R(1 + \sin \Theta/2), \quad \text{equation 7,}$$

where $\Theta = (180 L)/R$.

The total height of the cut is:

$$h' = h + R(1 - \cos \Theta) \quad \text{equation 8;}$$

and the contour length differential for the tangential cut is $$L' - CW' = L + (\Theta \pi r)/180 - (W \text{ male} - 2R), \quad \text{equation 9.}$$

The above equations are a first estimation for the fiber contour length differentials of relatively thin, twenty ply laminates. For very thick parts, greater than one inch, the contour length differentials for successive plies must be summed. As the tool geometry becomes more complex the tool surfaces are estimated utilizing appropriate CAD programs such NCAL (Northrop Corporation, Hawthorne, Calif.) and computer modeling.

An algorithm suitable for adaption to appropriate computer code utilizes the geometrical definition of the recess cuts for the tools as shown in FIG. 19. The algorithm calculates a cutter depth h and the cut width CW of a selected ball mill cutter, of radius R in order that the fiber contour length differential (L−CW), (which is a constant K) equals the fiber displacement during debulk where:

$$CW = 2R \sin \Theta/2, \quad \text{equation 10;}$$

and where $\Theta = (180 L)/(\pi R)$.

The interactive solution of CW is:

$$CW = 2R \sin (90 (K + CW));$$

where f (CW) = CW; and where K and R are constant.

To solve this equation for CW, successively values of CW are picked, the error is observed, and a new value of CW is picked to decrease the error as much as possible were:

$$ERROR = CW - f(CW).$$

A pseudocode for this algorithm is:

until the ERROR is acceptably small, pick a new CW.

To calculate the ERROR E and to make this algorithm efficient, a new CW is chosen. This can be done by successive linear approximations. The new CW is chosen by looking at the last two iterations and projecting where ERROR = 0. Thus:

$$CW^{NEW} = \frac{CW + (CW^2 - CW^1) E^1}{(E^1 - E^2)}$$

This algorithm quickly converges on CW final.

The above parameters are sufficiently robust to permit, as for instances, a 20% variation in the dimensions of the contours of an actual groove verses the calculated contours of the groove (or grooves) in the male tool. As a general design rule excessive increase, as for instance a 50% greater increase than calculated, in the dimensions of contours of the groove in the male tool will yield wrinkling of the preform when it is debulked in the female too. Further in transferring the preform from the male tool to the female, application of heat, as for instance with a heat lamp, serves to assist in the collapse of the preform into the shape of the female tool. Such application of heat might be especially useful for the embodiment of FIG. 10 in conforming the preform structure to a female cure tool.

Figure 17:
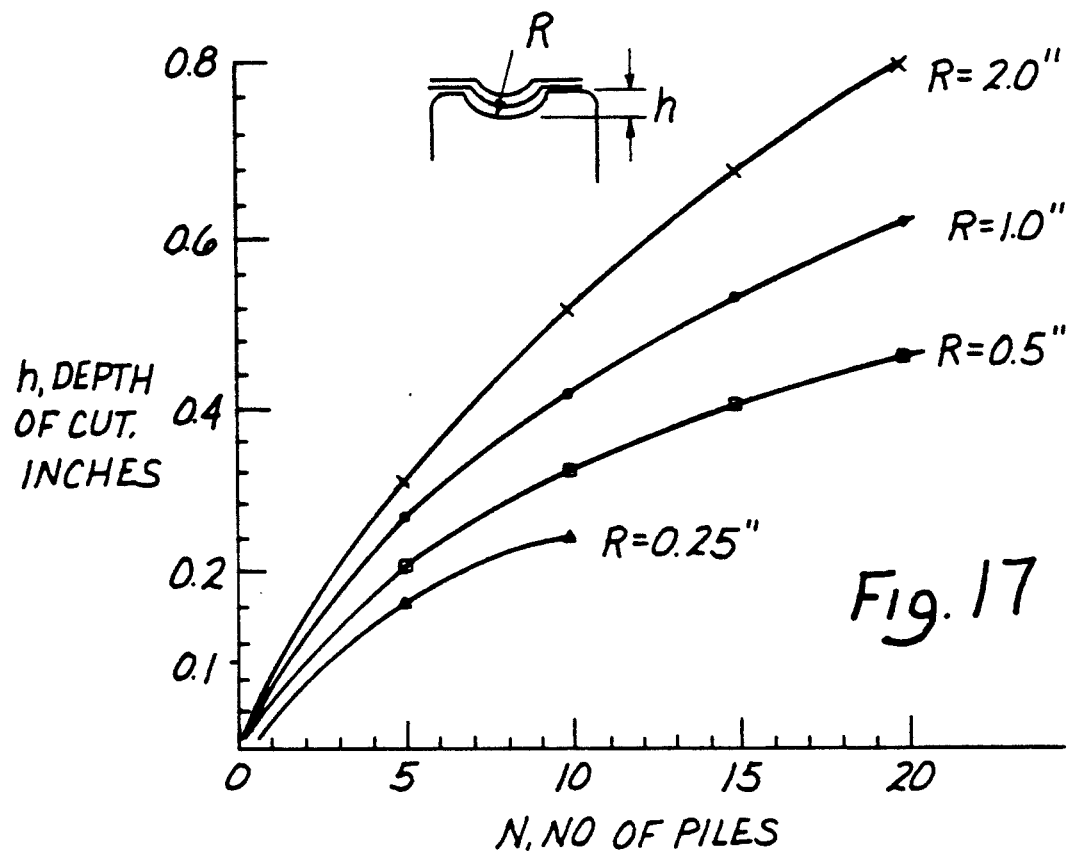
FIG. 17 is a chart illustrating depth of radius cut versus number of plies for shaping a male tool of the invention, as for instance the male tools of FIGS. 4, 9 and 12 above.
Figure 18:
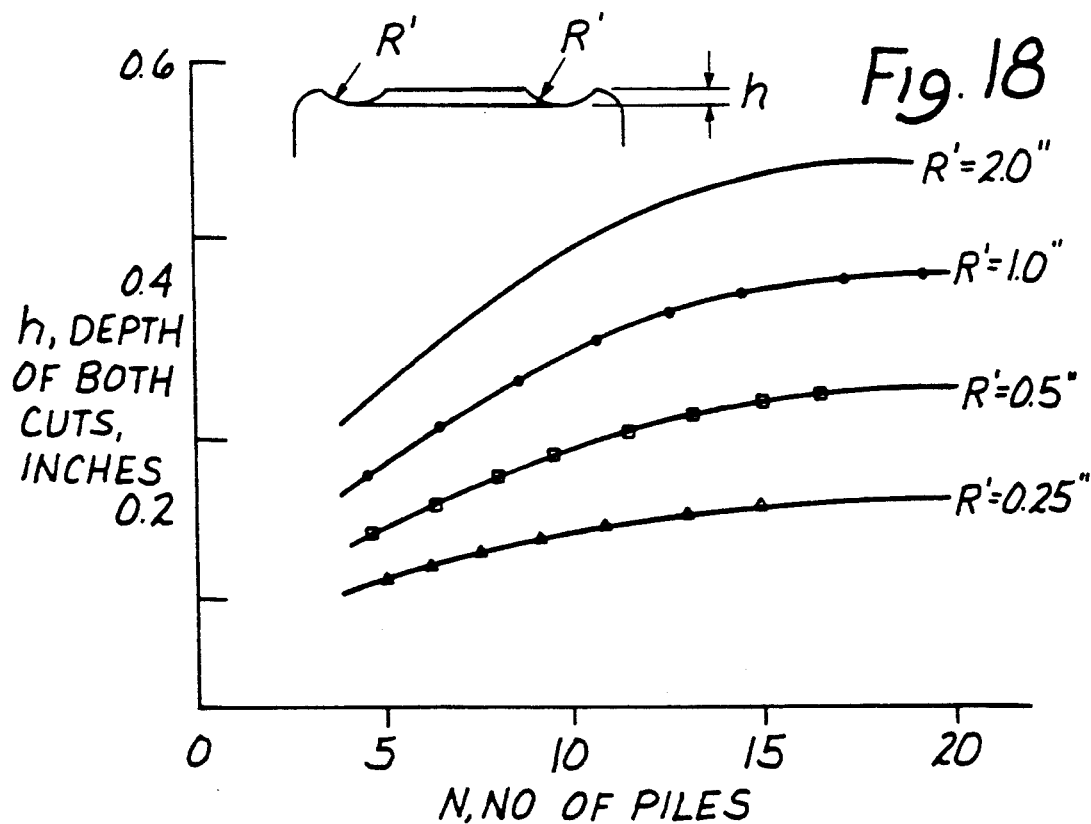
FIG. 18 is a view similar to FIG. 17 showing depth of radius cuts for shaping a male tool as depicted in FIG. 8 above.

Utilizing calculations similar to the above, graphs can be prepared as are shown in FIGS. 17 and 18 for the use in selecting the geometry of male tools of the invention. The graph of FIG. 17 utilizes a single groove formed in a male tool while that of FIG. 18 is for two grooves separated by a land. The radii selected are radii for appropriate milling or cutting tools, as for instance ball cutter radii. It is assumed that a single pass will be made with these tools and thus for convenience of forming the male tools, the height and width of the groove formed is made to be dependent upon the radii of the tool selected.

Further advantages of the invention include the lack of "springback" in the composite structures formed utilizing the invention and increased fiber loading within composite structures.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes that come within meaning and range of equivalency of the claims are therefore intended to be embraced therein.

What is claimed is:

1. A method of manufacturing a structural composite layup from a laminate of uncured layers of resin impregnated continuous fiber reinforced composite material in the shape of a mandrel a portion of which has an inside radius of curvature, comprising:

shaping said laminate around a tool having a portion with an outside radius of curvature conforming, when taken with the laminate, generally to that of said inside radius portion of said mandrel to form a shaped layup, providing on said tool, adjacent said outside radius of curvature, a deformation about which said laminate further extends to provide an additional bulk of laminate positioned to lie adjacent said inside radius and adequate to allow slippage between laminate layers when said shaped layup is later molded onto said mandrel, placing the shaped layup into said mandrel, thereafter applying pressure to said layup to press the layup into conformance with said mandrel and said inside radius of curvature therein, the excess material in said deformation allowing slippage between the laminate layers so that said additional bulk thereat moves into close conformance with said radius of inside curvature to form a consolidated composite closely conforming to said mandrel and its inside radius of curvature free of defects.

* * * * *